Jan. 21, 1936.     H. R. LUBIN     2,028,553
DISPENSING APPARATUS
Filed Aug. 8, 1934     3 Sheets-Sheet 3
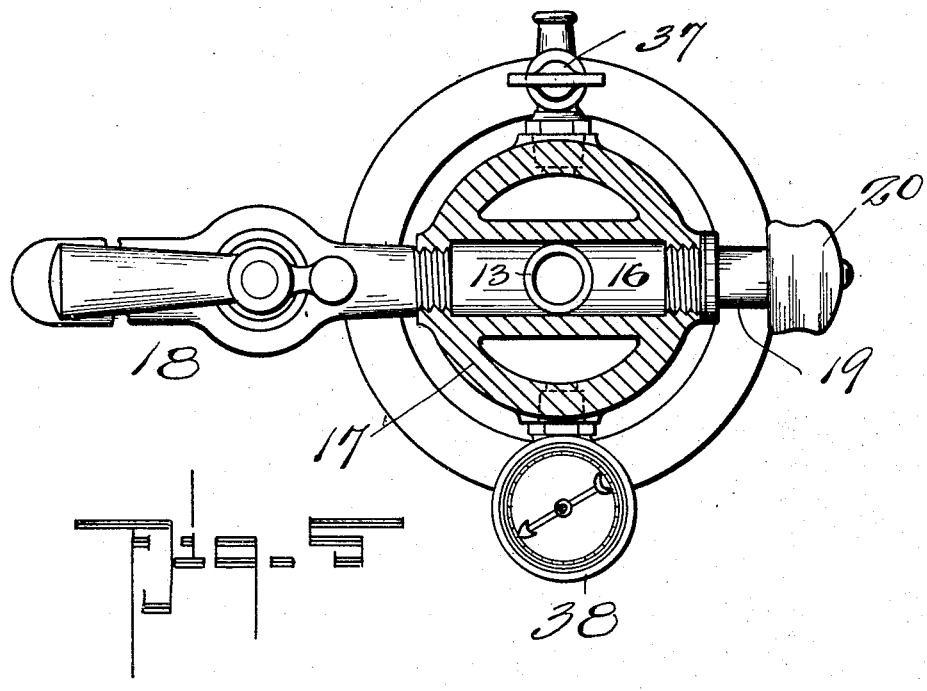
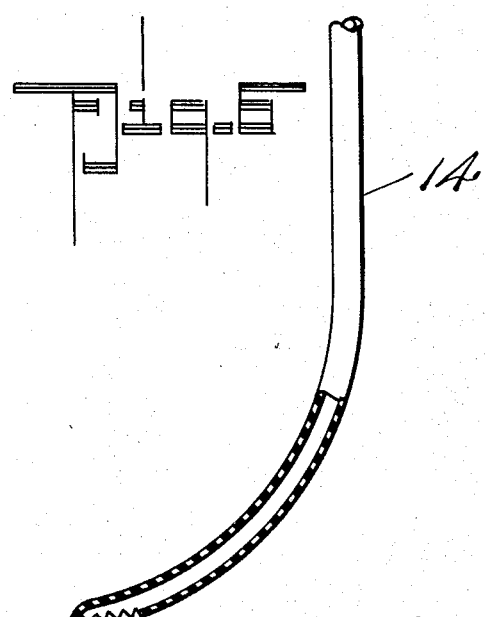
Harry R. Lubin
*Inventor*
By Herbert E. Smith
*Attorney*

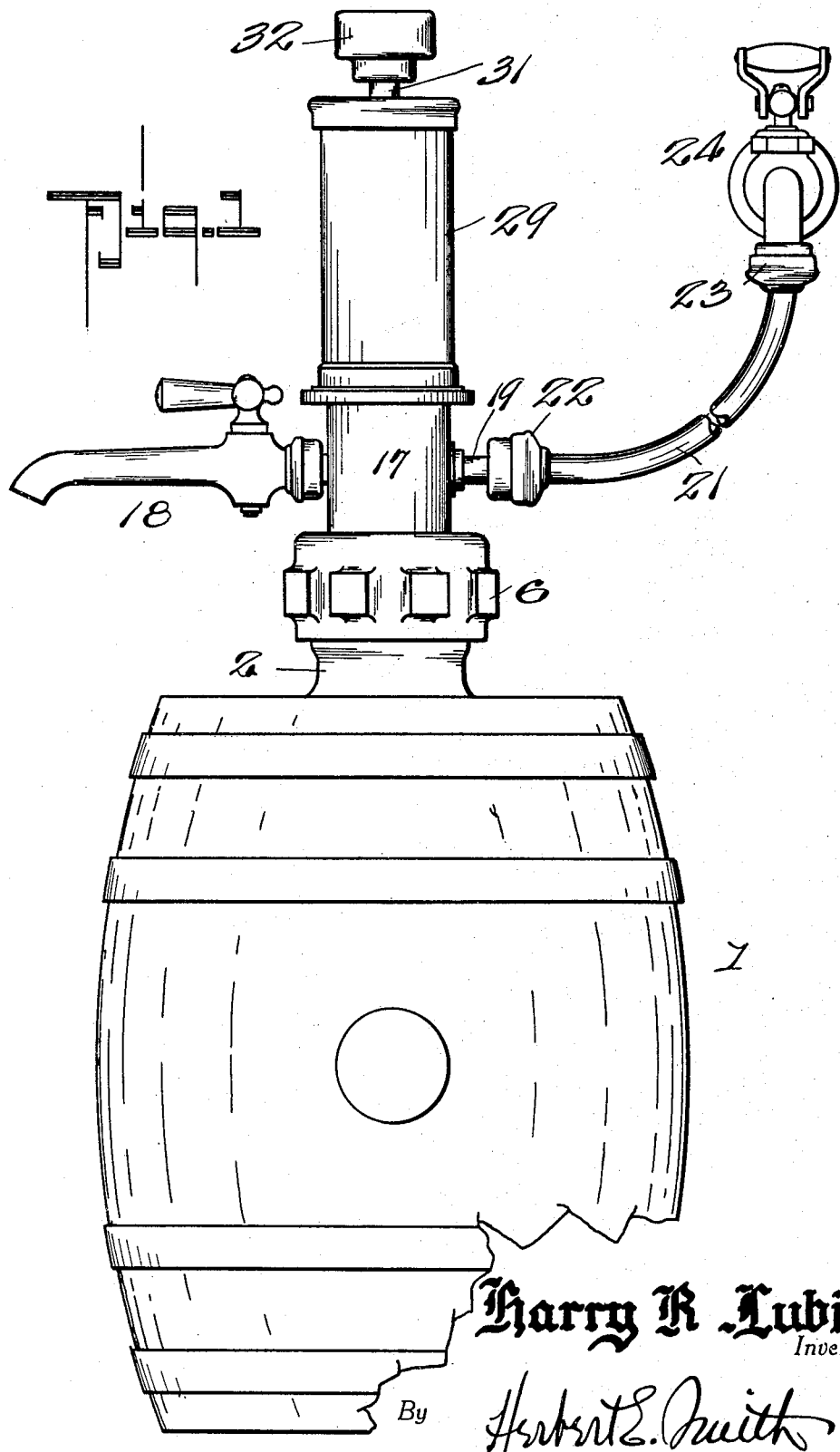

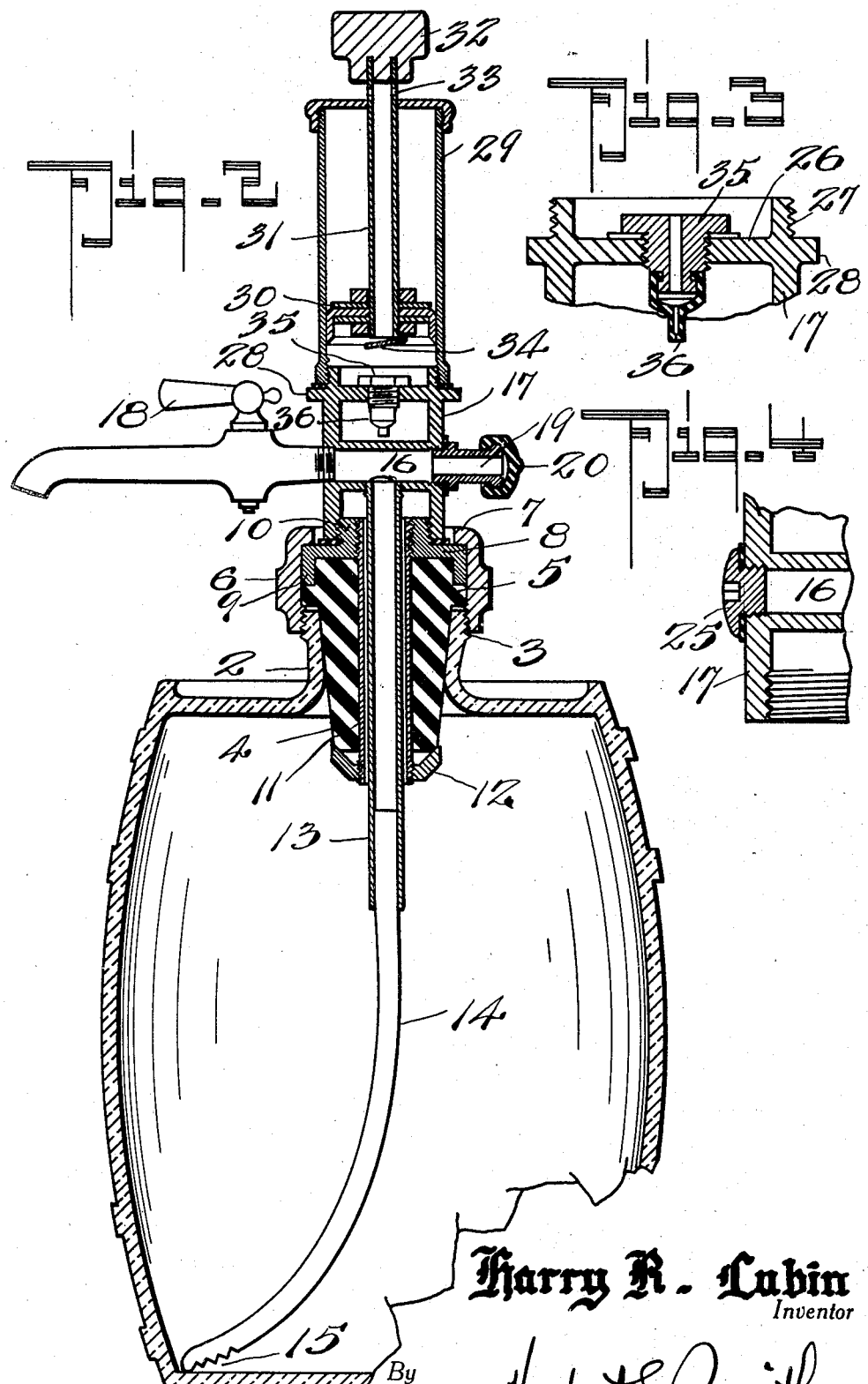

Patented Jan. 21, 1936

2,028,553

UNITED STATES PATENT OFFICE 2,028,553

DISPENSING APPARATUS

Harry R. Lubin, Spokane, Wash.

Application August 8, 1934, Serial No. 739,030

3 Claims. (Cl. 225—16)

My present invention relates to improvements in filling and dispensing apparatus for liquids, such as beer, and other beverages that are charged with, or contain, gas, and the primary object of the invention is the provision of means whereby a container may be filled with the beer, and whereby the beer may be dispensed from the container, without the formation of accompanying foam.

In carrying out my invention I combine in a portable apparatus, means for filling a jug or container with the beverage under pressure; means for introducing a fluid pressure to the container before it is filled with the beverage, or at other times; and means for dispensing the liquid from the container. These various functions are performed in co-operative relation one with another by the utilization of compactly combined and arranged devices which may readily be assembled for use, and operated with facility, and the various parts of the apparatus may be manufactured at comparatively low cost of production.

The invention consists in certain novel combinations and arrangements of parts as will hereinafter be more fully set forth and claimed. In the accompanying drawings I have illustrated one complete example of the physical embodiment of my invention wherein the parts are combined and arranged according to one mode I have thus far devised for the practical application of the principles of my invention, but it will be understood that changes and alterations may be made within the scope of my claims within the principles embodied therein.

Figure 1 is a view in elevation of an apparatus involving my invention, showing the filling means, charging means, and the dispensing device of the apparatus.

Figure 2 is a vertical sectional view of the parts of Figure 1, but omitting the filling means, and showing the apparatus employed for dispensing purposes.

Figure 3 is an enlarged detail sectional view of the pump discharge used to introduce air or gas pressure to the container.

Figure 4 is a detail sectional view showing a plug substituted for the dispensing faucet, when the latter is not required.

Figure 5 is an enlarged, cross sectional view, showing the vent cock and pressure gage employed when filling the container.

Figure 6 is a detail view, partly broken away, to show the construction of the flexible or rubber outlet pipe or hose.

In carrying out my invention I preferably employ a portable container 1, which may be in the form of a jug or keg as shown, and appropriate for domestic use, or for commercial use, and the various parts of the apparatus are standardized to conform to the size, shape, and other features of the container 1. As shown the jug has a neck 2, and an exteriorly threaded mouth 3, and these parts are designed to receive the detachable, tapered, rubber stopper or closure 4. The neck is also tapered, and this stopper, of rubber, or other suitable material, because of its shape may readily be inserted in the neck of the jug to insure a close, airtight fit. As best seen in Figure 2 the rubber stopper is fashioned, near its top face, with a laterally extending annular flange 5 that projects over the top edge of the mouth 3 of the jug. A lock nut 6, in the form of an interiorly threaded ring is mounted on the mouth-end of the jug, and turned tight to effect an airtight closure between the stopper and the neck of the jug. The lock nut is fashioned with an upper, interior flange 7, which bears on and retains a metal cap 8 on the top of the rubber stopper, and this cap has a flange or skirt 9 that extends down over the top of the stopper and engages against the top face of the flange 5 of the stopper. Thus it will be apparent that by turning the lock nut on the threaded mouth of the jug-neck the stopper is forced tightly into the tapering neck of the jug or container to insure a liquid tight and air or gas tight closure for the jug.

This pressure cap 8, on its upper face, is fashioned with a central, interiorly threaded boss 10, and a tube 11 which is mounted in a central opening of the stopper is threaded at its upper end in the boss, the tube, as shown extending downwardly and entirely through the stopper. The projecting, lower end of the tube is provided with external threads to receive a clamp nut 12, of somewhat conical shape, and this nut, when screwed home on the tube, against the lower tapered end of the stopper, provides a rigid bottom-support for the rubber stopper and maintains its shape, to insure proper performance of its functions.

The tube 11 provides a guard or housing for the metal outlet pipe 13, and as indicated in Figure 2, the pipe because of its smaller diameter, also provides an annular space within the tube for introduction of fluid pressure gas, or air, to the interior of the jug, or to the contents of the jug.

Within the metal outlet pipe 13 is mounted an adjustable hose 14, of rubber or other suitable material, the upper end of the hose being telescoped within the metal pipe and retained therein by frictional contact therewith. The lower end of the hose is provided with an intake or inlet port 15, the walls of which are formed with a serrated edge for the purpose of elevating the port to provide the necessary intake openings for the liquid, or beer, being drawn from the jug.

The upper end of the metal outlet pipe 13 is rigidly connected in suitable manner with a cross-tube 16 that is arranged transversely of, and integral with the cylindrical casing 17, and this casing, which is open at its lower end, has internal threads by means of which it is rigidly attached to complementary external threads on the boss 10.

At one end, this cross-tube 16 is provided with a dispensing faucet 18 of suitable type, to provide direct passage of the dispersed liquid from the jug through the hose 14, pipe 13, tube 16 and the faucet. At its opposite end, the cross tube is provided with an attaching nipple 19, which, when the apparatus is employed for dispensing liquid as in Figure 2, is closed by means of a readily detachable closure or cap 20. This cap or closure may be of rubber or other suitable material to insure an efficient air-tight closure for the nipple 19.

For filling the jug with beer, I employ a hose 21 (Fig. 1) which has an attaching nipple 22 that is secured over the fixed nipple 19, for use, and the hose is connected at its other end by a nipple 23 to the valve or fixture 24 that controls the supply of beer. When filling the jug with beer from the control device, the faucet 18 is of course closed, and the liquid flows through the connections to the cross tube and down through the pipes 13 and 14 to the interior of the jug.

In Figure 4, a screw plug 25 is shown as closing one end of the tube or cross tube 16, and this closure plug may be employed in lieu of the faucet, with the latter, removed, for storage of the contents of the jug. Under such conditions, the closure 20 of Figure 2 is also employed, to close the other end of the cross tube 16.

Before filling the jug with beer, as described, I provide fluid pressure within the jug 1, to approximately the same degree of pressure as with which the beer is charged, and this fluid pressure is expelled or vented from the jug as the beer is fed or flows thereto, thus preventing commotion within the liquid contents of the jug and consequent foaming therein.

For this purpose I mount a preferably manually operated air or gas pump on the top of the apparatus, and I utilize the closed head 26 of the casing 17 as the bottom head of the pump. The head 26 is fashioned with a cylindrical, externally threaded flange 27, and also with a laterally extending annular, exterior flange 28 at the base of the threaded flange. The pump cylinder 29 is threaded on the flange 27 and the open end of the pump cylinder seats on the lateral flange 28 to insure a tight and rigid joint.

A suitable piston or plunger 30 is mounted to reciprocate within the pump cylinder, and its tubular stem 31 which projects through an opening in the upper end of the cylinder is provided with a handle or knob 32 to facilitate manual operation of the pump. Ports 33 are provided in the tubular stem 31 for admission of air, and the inner end of the tube or tubular stem 31, beneath the piston, is provided with a flap valve 34 that opens toward the container or jug. In the head 26, below the piston, an injector plug 35 is threaded, and this plug is provided with an injector nipple 36, of rubber or similar material, through which the charge of air passes as it is injected into the casing 17 from whence the charge passes into the jug or container 1. The piston of course forces air into the jug on its downward stroke, and at that time the pump valve 34 is closed. On the up stroke or idle stroke of the piston the valve is opened to permit access of a charge of air to the cylinder below the receding piston.

For venting the jug, and regulating the degree of pressure of air or gas in the container, I employ a vent valve or cock 37, shown in Figure 5 as attached to the cylindrical casing, and for indicating the degree of pressure in the jug or its contents, I utilize a well known type of gage 38, also connected with the cylindrical casing 17.

From this description taken in connection with the drawings it will be apparent that the combined filling, charging, and dispensing devices of the apparatus, may readily be mounted on or attached to the jug or container for use in the performance of their several functions, and may with equal facility be operated as required, and if desired, the apparatus may readily be detached from the jug.

In some instances the pump parts may be disconnected by unscrewing the pump cylinder 29 from the casing 17, and the injector 35 removed, in order that an injector nozzle may be substituted for the injector 35, the replacing nozzle being fitted to the threaded opening in the head 26 and connected with a suitable air or gas hose through which power-operated means injects the air or gas to the jug or container.

In Figure 1 the apparatus is in position for dispensing beer direct from the supply-control 24, through the open faucet 18, or, the faucet may be closed, the container filled, the hose 21 removed and replaced by the cap 19, and then the filled container or jug may be carried away for storage, or for individual dispensing purposes through the use of the pump and the discharge faucet. The pump may be employed to place the contents of the jug under pressure, and then when the faucet is opened the internal pressure forces the beer, with its contained gas through the dispensing parts. The beer is thus maintained in its fresh, live condition, and is served or dispensed without loss of its desired characteristics.

Having thus fully described my invention, what I claim as new and desire to secure by Letters Patent is:—

1. The combination with a container having a tapered neck, of a tapered, resilient stopper having an annular flange having a central tube, a conical clamp nut on the inner end of the tube engaging the outer periphery of said stopper, a presser-cap rigid with the other end of the tube and having a shoulder engaging the flange on said stopper, an attaching nut threaded to the neck and having a flange engaging the presser cap, a casing mounted on said cap and a cross tube in said casing, a faucet at one end of the cross tube and a port at the opposite end of the tube, a pipe connected to the cross tube and extending through the central tube to form an annular chamber in the latter in communication with the casing, and means for charging fluid pressure to said chamber through the casing.

2. The combination with a container having a threaded neck, of a resilient stopper having a lateral flange, a central tube in the stopper, a presser-cap secured to the tube and having a flange seated on the stopper-flange, an attaching nut threaded on the neck, and an inner annular flange on said nut engaging the presser-cap.

3. In an apparatus as described, the combination with a container having an externally threaded neck, of a resilient stopper having a lateral flange and having a central open end tube therein, a conical clamp nut located at the inner end of the tube for engagement with the periphery of the stopper, a pressure-cap at the other end of the stopper and rigid with the tube, an attaching nut engaging the neck, and a flange on the nut engaging said stopper flange, for retaining the parts in airtight relation.

HARRY R. LUBIN.